T. F. GLENN.
METHOD OF PRODUCING ARTIFICIAL TEETH.
APPLICATION FILED NOV. 8, 1916.
1,309,127.
Patented July 8, 1919.
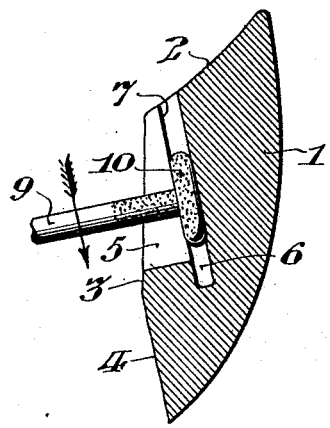
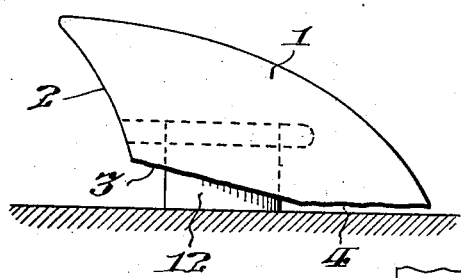
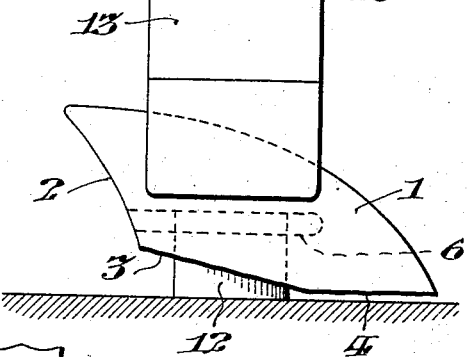
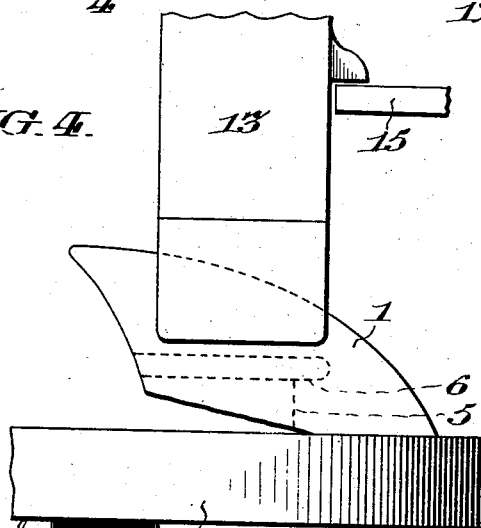

UNITED STATES PATENT OFFICE.

THOMAS F. GLENN, OF ARDMORE, PENNSYLVANIA, ASSIGNOR TO THE S. S. WHITE DENTAL MANUFACTURING COMPANY, A CORPORATION OF PENNSYLVANIA.

METHOD OF PRODUCING ARTIFICIAL TEETH.

1,309,127.  Specification of Letters Patent.  Patented July 8, 1919.

Application filed November 8, 1916. Serial No. 130,121.

*To all whom it may concern:*

Be it known that I, THOMAS F. GLENN, a citizen of the United States, and a resident of Ardmore, in the county of Montgomery, State of Pennsylvania, have invented certain new and useful Improvements in Methods of Producing Artificial Teeth, of which the following is a specification, reference being had to the accompanying drawings.

My invention relates to the manufacture of artificial teeth, particularly to tooth fronts or facings, and is especially directed to the method of truing and facing the surfaces with which the tooth supporting structure is to be engaged.

The commercial success of all artificial tooth facings depends wholly upon their interchangeability, and, consequently, upon the accuracy of the relative position of the surfaces which coact with the backing or support, to effect the desired rigidity by snugly fitting and interlocking with the corresponding opposed surfaces thereof.

The principal objects of my invention are, to provide a method of handling such teeth that will greatly expedite the truing and facing operations requisite to the accurate correlation of the different trued and faced surfaces.

My invention further comprehends the method of truing and facing the exterior surface of a tooth facing having a recess, which consists in utilizing said recess as a guide by which the truing and facing of such exterior surface may be accurately effected.

My invention refers more specifically to the order in which the various operations may be effected to obtain the most economical results, and avoid excessive grinding of the interior surfaces which are most difficult of access.

My invention also includes all of the various novel features of the method by which the tooth facing is most conveniently and economically produced, as will be hereinafter more definitely specified.

In the accompanying drawings, Figure 1 is a central longitudinal sectional view of a tooth facing showing the method of grinding and truing the surfaces of the retaining recess; Fig. 2 is a diagrammatic illustration of a tooth gage, showing a tooth supported thereby in position to be engaged with a tooth holder or mounting, by which said tooth is held while having its exterior surfaces ground; Fig. 3 is a view similar to Fig. 2, showing the tooth mounting in position to grasp the tooth; and Fig. 4 is a diagrammatic illustration of the tooth mounting shown in Fig. 3, holding the lingual surface of the tooth in engagement with the plane side of a grinding wheel.

In said figures, the tooth body 1, as shown in Fig. 1, which may be preferably composed of porcelain, has its lingual face formed of relatively angular surfaces 2, 3 and 4, and is provided with a recess which may be in the form of an undercut slot or groove 5, extending longitudinally of the facing and comprising a broad, flat cavity 6 forming a bore, the lingual surface 7 of which is parallel with the plane of the lingual surface 4 of the tooth body.

In order that the tooth facing may accurately conform to the backing, it is essential that the surfaces of the tooth be trued to a definite relation, and as the exterior surface is the most accessible for grinding, I prefer to first effect the truing of the surfaces of the recess which are less accessible, so that any excessive grinding due to the warping or distortion of the tooth body, may be performed upon that surface which is most easy of access.

The truing of the surfaces of the recess may be effected as described in my prior Patent No. 1,187,520 by a rotatable tool, as shown in Fig. 1, having the shank 9 provided with a head 10 of larger diameter than said shank and of any desired contour, depending upon the size and shape of the recess to be ground, and the grinding tool may be entered from the gingival end of the tooth and progressed longitudinally thereof through the recess, as indicated by the arrow.

Although I have shown and described the grinding tool as contemporaneously truing the slot and bore of the recess, it is to be understood that they may be separately trued; for instance, the slot may be trued by a spindle or mandrel which is not provided with a head, in the same manner as it is trued by the shank of the tool shown in Fig. 1, and the axis of said spindle or mandrel may assume the same position as said shank, or it may be disposed in other positions.

The recess thus trued affords a convenient guide by which the lingual surface of the tooth may be trued with absolute accuracy. This may be effected by supporting the tooth upon the bracket 12 which serves as a gage, see Fig. 2; and while thus supported said tooth may be grasped by a suitable mounting or holder 13 which may be provided with any convenient means of engaging the tooth, and which may be limited in its movement toward the gage by the stop 15 which, as will be observed, causes the mounting to bear a definite relation to the recess in the tooth.

Having thus mounted the tooth in the holder or mounting 13, said tooth may be withdrawn from the gage 12 and shifted into position to engage the grinding wheel 16, against the plane side of which it is thrust by the holder 13, as best shown in Fig. 4, until said holder is arrested by the stop 15 which determines the amount of grinding necessary to provide the proper relation between the lingual surface of the tooth and its recess.

Although I have shown and described means for grinding the surface of the recess, it may be found that in some instances the recess may be utilized as a guide without grinding, and therefore I do not desire to limit my invention to the precise procedure set forth.

It is to be understood that the structures for holding the teeth as herein shown and described are diagrammatical illustrations, typical of devices which may be employed to effect my improved method of truing the surfaces of artificial teeth in a definite relation, and are merely shown as a basis upon which to predicate claims to protect my method.

Having thus described my invention, I claim:

1. The method of truing the surfaces of an artificial tooth having a recess, which consists in utilizing said recess as a guide for truing the exterior surface of said tooth.

2. The method of truing the surfaces of an artificial tooth having a recess comprising a bore and slot, which consists in truing the slot, then truing the bore, and utilizing the trued recess as a guide for truing the exterior surface of said tooth.

3. The method of truing the surfaces of an artificial tooth having a recess comprising a bore and slot, which consists in truing the bore, then truing the slot, and utilizing the trued recess as a guide for truing the exterior surface of said tooth.

4. The method of truing the lingual surface of an artificial tooth having a recess therein, which consists in placing a tooth on a gage by means of said recess serving as a guide, gripping the tooth by means actuated in a definite relation with respect to said gage to determine the relation of said recess and lingual surface of the tooth, and utilizing said gripping means for effecting the truing of said lingual surface to the required relation.

In witness whereof, I have hereunto set my hand this 7th day of November, A. D., 1916.

THOMAS F. GLENN.

Witnesses:
WILLIAM J. RUSSELL,
CLIFTON C. HALLOWELL.